(12) United States Patent
Takanashi

(10) Patent No.: US 8,711,274 B2
(45) Date of Patent: Apr. 29, 2014

(54) IMAGE PROCESSING APPARATUS AND METHOD CONFIGURED TO CALCULATE DEFOCUS AMOUNT OF DESIGNATED AREA

(75) Inventor: Hideya Takanashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 235 days.

(21) Appl. No.: 12/837,988

(22) Filed: Jul. 16, 2010

(65) Prior Publication Data

US 2011/0019015 A1    Jan. 27, 2011

(30) Foreign Application Priority Data

Jul. 23, 2009 (JP) ................ 2009-172088

(51) Int. Cl.
*H04N 5/232* (2006.01)
*G03B 3/10* (2006.01)

(52) U.S. Cl.
USPC .......................................... 348/349; 396/123

(58) Field of Classification Search
USPC ............. 348/345, 208.6, 346, 347, 349, 352, 348/350, 340, 355, 348, 208.99; 396/123
See application file for complete search history.

(56) References Cited

U.S. PATENT DOCUMENTS

| | | | | |
|---|---|---|---|---|
| 6,829,008 B1* | 12/2004 | Kondo et al. | ................ | 348/302 |
| 7,412,159 B2* | 8/2008 | Ichimiya | ................ | 396/104 |
| 7,796,877 B2* | 9/2010 | Tsuchiya | ................ | 396/123 |
| 2003/0174230 A1* | 9/2003 | Ide et al. | ................ | 348/345 |
| 2006/0018650 A1* | 1/2006 | Ichimiya | ................ | 396/104 |
| 2008/0166116 A1* | 7/2008 | Tsuchiya | ................ | 396/89 |
| 2008/0317454 A1 | 12/2008 | Onuki | | |
| 2009/0135264 A1* | 5/2009 | John | ................ | 348/220.1 |

FOREIGN PATENT DOCUMENTS

| | | |
|---|---|---|
| JP | 05-203865 A | 8/1993 |
| JP | 10-020184 A | 1/1998 |
| JP | 2001-174690 | 6/2001 |
| JP | 2002-023241 A | 1/2002 |
| JP | 2005-227639 | 8/2005 |
| JP | 2007-065002 A | 3/2007 |
| JP | 2007318190 A * | 12/2007 |
| JP | 2008-107480 A | 5/2008 |
| JP | 2008-252226 A | 10/2008 |
| JP | 2008-310072 A | 12/2008 |
| JP | 2009-003122 | 1/2009 |

OTHER PUBLICATIONS

The above references were cited in a European Search Report issued on Oct. 28, 2010, that issued in the corresponding European Patent Application No. 10170113.4.
The above references were cited in a Apr. 16, 2013 Japanese Office Action, enclosed without English Translation, that issued in Japanese Patent Application No. 2009-172088.

* cited by examiner

*Primary Examiner* — Ahmed A Berhan
(74) *Attorney, Agent, or Firm* — Cowan, Liebowitz & Latman, P.C.

(57) ABSTRACT

An image processing apparatus includes a focus detector configured to detect a focus state of a focus detection area by detecting a shift amount between a pair of image signals of an object image, a memory configured to store an image photoelectrically converted and output from an image pickup device, the focus detection area, and the image signals, a setting unit configured to set a designated area in the image stored in the memory, a calculating unit configured to calculate a defocus amount of the designated area using the pair of image signals corresponding to the designated area among the image signals stored by the memory, and a display unit configured to display the defocus amount of the designated area.

14 Claims, 10 Drawing Sheets

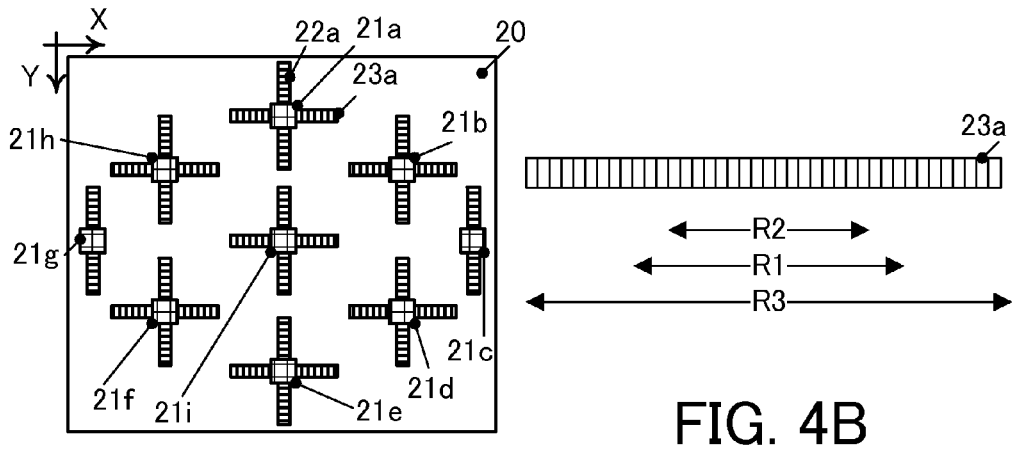
FIG. 4A
FIG. 4B
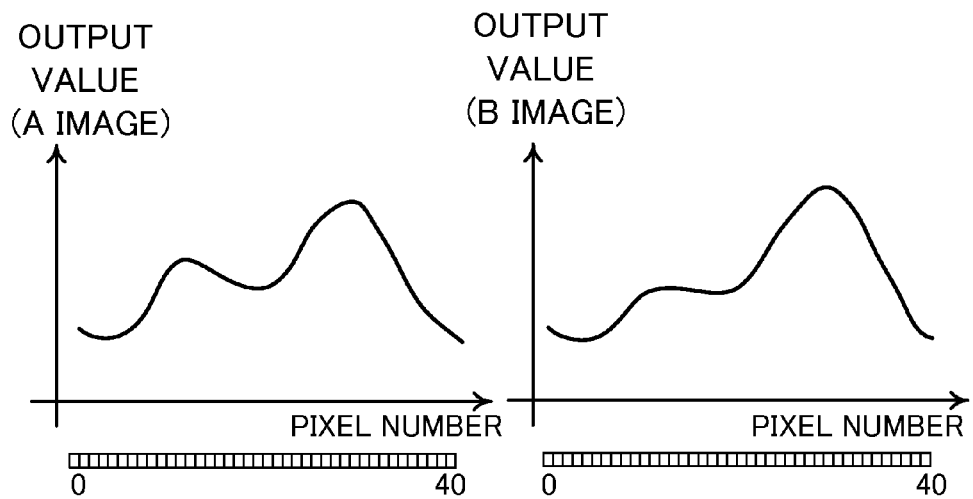
FIG. 4C
| IMAGE ID | STARTING COOR-DINATE | ENDING COOR-DINATE | A IMAGE [0] | A IMAGE [1] | ... | A IMAGE [40] | B IMAGE [0] | B IMAGE [1] | ... | B IMAGE [40] |
|---|---|---|---|---|---|---|---|---|---|---|
| IMG 0001 | $(X_S, Y_S)$ | $(X_E, Y_E)$ | 168 | 134 | ... | 20 | 188 | 149 | ... | 32 |
FIG. 4D

IMAGE PROCESSING APPARATUS AND METHOD CONFIGURED TO CALCULATE DEFOCUS AMOUNT OF DESIGNATED AREA

BACKGROUND OF THE INVENTION

1. Field of the Invention

The present invention relates to an image processing apparatus and method.

2. Description of the Related Art

Japanese Patent Laid-Open No. ("JP") 2001-174690 discloses an image pickup apparatus that enables a user to freely correct an adjustment value used to calibrate a defocus amount of an image pickup lens which was set at the factory shipping time. JP 2005-227639 discloses an image pickup apparatus having an autofocus ("AF") micro adjustment that is a fine adjustment function in the AF for each lens. JP 2009-003122 discloses an image pickup apparatus that provides focus detecting pixels to an image pickup device and realizes a phase difference detection function.

As described above, there is a function that enables a photographer to manually set a correction value of a defocus amount. In using this function, the photographer determines the correction value by his own sense after he confirms a taken image (reproduced image). Thus, the manipulation is arduous because the setting of the correction value and the confirmation of the reproduced image are repeatedly performed. In addition, in a specific shooting scene, a position that is actually to be focused in a screen may be different from a photographer's focus position. For example, although the photographer pursues a focus on an eye of a racing driver (which is the position actually to be focused in the screen), the helmet of the racing driver is focused (which is the photographer's focus position). In this case, it is convenient that the camera provides autofocus onto the eye of the racing driver when the photographer operates the camera so that the helmet of the racing driver can be focused, only if the photographer sets a defocus amount in advance. However, when the helmet of a racing driver is focused upon but the racing driver's face and eyes are defocused, the prior art proposes no means to provide information of a defocus amount of an object for focus-detection.

SUMMARY OF THE INVENTION

The present invention provides an image processing apparatus and method, which can precisely and simply provide information regarding a defocus amount of an object to be focus-detected.

An image processing apparatus according to one aspect of the present invention includes a focus detector configured to detect a focus state of a focus detection area by detecting a shift amount between a pair of image signals of an object image, a memory configured to store an image photoelectrically converted and output from an image pickup device, the focus detection area, and the image signals, a setting unit configured to set a designated area in the image stored in the memory, a calculating unit configured to calculate a defocus amount of the designated area using the pair of image signals corresponding to the designated area among the image signals stored by the memory, and a display unit configured to display the defocus amount of the designated area.

Further features of the present invention will become apparent from the following description of embodiments with reference to the attached drawings.

BRIEF DESCRIPTION OF THE DRAWINGS

FIGS. 4A-4D are views for explaining an AF control illustrated in FIG. 3.

DESCRIPTION OF THE EMBODIMENTS

This embodiment relates to an image processing apparatus and method configured to process an image taken by an image pickup apparatus. The image processing apparatus may be integrated with the image pickup apparatus so that image processing may be executed in the image pickup apparatus, or may be formed as an external processor, such as a personal computer ("PC"), separate from the image pickup apparatus. The image processing method is implemented as a program that enables a processor to realize an image processing function.

Figure 1:
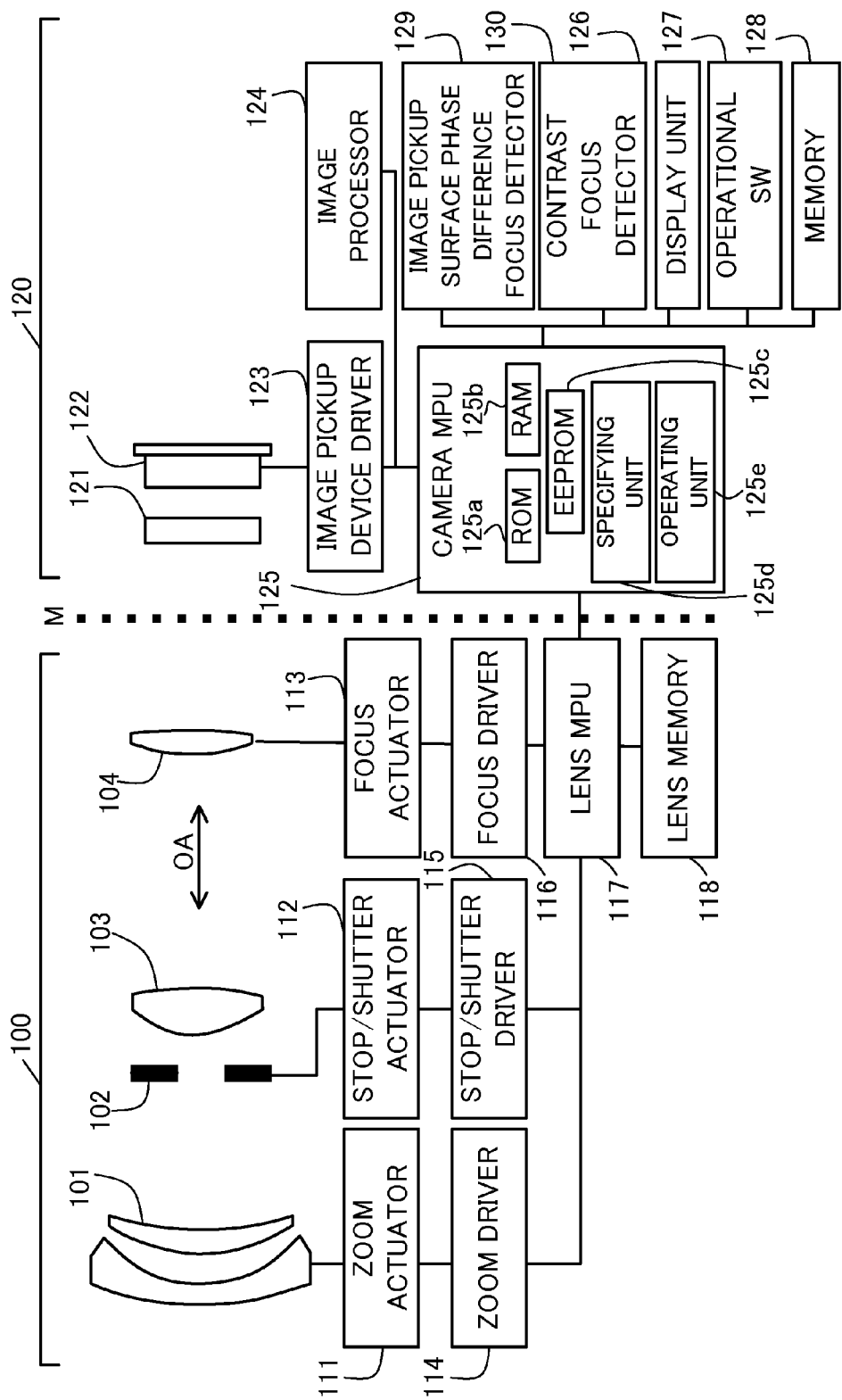
FIG. 1 is a block diagram of an image pickup apparatus to which the present invention is applicable.

FIG. 1 is a block diagram of a digital camera (image pickup apparatus) to which the present invention is applicable. The digital camera of this embodiment is an exchangeable lens type single-lens reflex camera, and includes a lens unit 100 and a camera body 120. The lens unit 100 is connected to the camera body 120 via a mount M depicted by a central dotted line in FIG. 1.

The lens unit 100 includes a first lens unit 101, a shop/shutter 102, a second lens unit 103, a focus lens unit (simply referred to as a "focus lens" hereinafter) 104, and a drive/control system. Thus, the lens unit 100 has an image pickup lens configured to form an image of an object and provided with the focus lens 104.

The first lens unit 101 is located at the head of the lens unit 100, and held movably back and forth in an optical axis direction OA. The stop/shutter 102 serves to regulate the light quantity at the image pickup time by adjusting its aperture diameter, and serves as a shutter configured to adjust an exposure second at a still image pickup time. The stop/shutter 102 and the second lens unit 103 are configured to move back and force as a single unit in the optical axis direction OA, and realize a zoom function in association with the forward and backward movements of the first lens unit 101. The focus lens 104 is configured to move back and forth in the optical axis direction OA for focus adjustments.

The drive/control system includes a zoom actuator 111, a stop/shutter actuator 112, a focus actuator 113, a zoom driver 114, a stop/shutter driver 115, a focus driver 116, a lens MPU 117, and a lens memory 118.

The zoom actuator 111 is configured to move the first lens unit 101 or the second lens unit 103 back and forth in the optical axis direction OA for zooming. The stop/shutter actuator 112 controls the aperture diameter of the stop/shutter 102 so as to adjust an image pickup light quantity, and to control an exposure time period at the still image pickup time.

The focus actuator 113 is configured to move the focus lens 104 back and forth in the optical axis direction OA for focusing. The focus actuator 113 can serve as a position detector configured to detect a current position of the focus lens 104.

The zoom driver 114 is configured to drive the zoom actuator 111 in accordance with a user's zooming manipulation. The stop/shutter driver 115 controls the aperture of the stop/shutter 102 by controlling driving of the stop/shutter actuator 112.

The focus driver 116 controls driving of the focus actuator 113 based on a focus detection result, and moves the focus lens 104 back and forth in the optical axis direction OA for focusing.

The lens MPU 117 is responsible for all operations and controls relating to the image pickup lens, and controls the zoom driver 114, the stop/shutter driver 115, the focus driver 116, and the lens memory 118. In addition, the lens MPU 117 detects a current lens position, and informs the camera MPU 125 of lens position information in response to a request from the camera MPU 125. The lens memory 118 stores optical information necessary for the AF.

The camera body 120 includes an optical low-pass filter 121, an image pickup device 122, and a drive/control system.

The optical low-pass filter 121 and the image pickup device 122 serve as an image pickup optical system configured to form an object image using light from the lens unit 100.

The optical law-pass filter 121 is configured to reduce a false color and moiré of a taken image.

The image pickup device 122 includes a C-MOS sensor and its peripherals, in which a single photoelectric conversion element is arranged on light receiving pixels including "m" pixels in a lateral direction and "n" pixels in a longitudinal direction, and configured to photoelectrically convert an object image. The image pickup device 122 is configured to output data from each of the pixels independently. In addition, some pixels are assigned as image detecting pixels configured to detect a focus state on an image pickup surface in a phase difference detection method (an image pickup surface phase difference AF).

More specifically, the image pickup device 122 includes a plurality of image pickup pixels each of which receives light that passes the entire region of an exit pupil of the image pickup lens and generates an electric signal representative of the object image. In addition, the image pickup device 122 further includes a plurality of focus detecting pixels each of which receives light that passes a part of the exit pupil of the image pickup lens. The plurality of focus detecting pixels as a whole can receive the light that passes the entire region of the exit pupil of the image pickup lens. For example, in four pixels of 2 columns times 2 rows in the image pickup device 122, an R pixel and a B pixel are replaced with the focus detecting pixels while a pair of diagonal G pixels is left as image pickup pixels.

The drive/control system includes an image pickup device driver 123, an image processor 124, a camera MPU 125, a display unit 126, operational switches ("SW") 127, a memory 128, an image pickup surface phase difference focus detector 129, and a contrast (TVAF) focus detector 130.

The image pickup device driver 123 is configured to control an operation of the image pickup device 122, A/D-converts an obtained image signal, and sends a resultant digital signal to the camera MPU 125. The image processor 124 performs a γ conversion, a color interpolation, and a JPEG compression for the obtained image.

The camera MPU (controller or processor) 125 is a processor responsible for all of operations and controls relating to the camera body 120. The camera MPU 125 controls the image pickup device driver 123, the image processor 124, the display unit 126, the operational SW 127, the memory 128, the image pickup surface phase difference focus detector 129, and the contrast focus detector 130.

The camera MPU 125, connected to the lens MPU 117 via a signal line of the mount M, issues a lens position request or a lens driving request with a predetermined driving amount to the lens MPU 117, and obtains optical information peculiar to the lens unit 100, such as a focal length. The camera MPU 125 includes a ROM 125a configured to store a program used to control the camera operation, a RAM 125b configured to store variables, and an EEPROM 125c configured to store a variety of parameters. The variety of parameters include a threshold L1, a threshold D1, a threshold Num_TH, a threshold Con_TH, and a correction amount of a defocus amount of a designated area 34, which will be described later.

The camera MPU 125 executes a program stored in the ROM 125a, as described later. For example, the camera MPU 125 performs the AF control adapted to drive the focus lens 104 via the lens MPU 117 based on a detection result of the image pickup surface phase difference focus detector 129 or the contrast focus detector 130.

In addition, as illustrated in S405 and S500 in FIG. 5, which will be described later, the camera MPU 125 serves as a specifying unit 125d configured to specify a pair of image signals corresponding to the designated area 34 among the image signals stored in the memory 128. Moreover, the camera MPU 125 also serves as an operating unit 125e, as illustrated in S406 in FIG. 5, which will be described later, configured to operate a defocus amount of the designated area 34 using the phase difference detection method and the pair of image signals specified by the specifying unit 125d.

When the image processing apparatus is a PC, a processor (CPU) of the PC serves as the specifying unit 125d and the operating unit 125e. Of course, one processor does not have to serve both functions of the specifying unit and the operating unit, and these functions may be distributed between the camera and the PC, for example.

The display unit 126 includes a liquid crystal display ("LCD") monitor or the like. The display unit 126 displays information concerning an image pickup mode of the camera, a preview image before it is taken, an image for confirmation after it is taken, a focus detection area selected at the image pickup time, the designated area 34, an on-focus state at the focus detection time, a defocus amount of the designated area 34, etc. When the image processing apparatus is a PC, the PC's display unit displays a taken image, a designated area 34, and a defocus amount of the designated area 34.

The operational switches (simply referred to as an "operational SW" hereinafter) 127 includes a power switch, a release (image pickup trigger) switch (SW1, SW2), a zooming switch, an image pickup mode selecting switch, a dial, and other input parts. The operational SW 127 serves as a setting unit configured to set a focus detection area to be actually focus-detected from among a plurality of focus detection areas displayed on a viewfinder.

The operational SW 127 also serves as a setting unit configured to set the designated area 34 in an image stored in the memory 128. The operational SW 127 also serves as a setting means configured to determine whether a correction amount of a defocus amount of the designated area 34 is set to the image pickup apparatus or a setting unit configured to validate or invalidate a set correction amount. The operational SW 127 also serves as a selector configured to select one of a variety of menus including a correction amount setting menu configured to set a correction amount used to correct a defocus amount of the designated area 34. When the correction amount of the defocus amount of the designated area 34 is set to the image pickup apparatus, the image pickup apparatus corrects the focus state based on the defocus amount in focusing at the image pickup time.

When the image processing apparatus is a PC, this setting unit is a variety of input members, such as a keyboard and a pointing device (e.g., a mouse).

The memory 128 is a removable flash memory configured to record a taken image (or an image output from the image pickup device 122), and the image processing apparatus processes this image. The memory 128 records a plurality of focus detection areas, a specific focus detection area that has been selected as an object to be focus-detected at the image pickup time among the plurality of focus detection area, and a pair of image signals corresponding to each focus detection area.

The image pickup surface phase difference focus detector 129 is a focus detector configured to detect a focus state using a phase difference detection method and image signals from the focus detecting pixels embedded in the image pickup device 122. More specifically, the image pickup surface phase difference focus detector 129 is a focus detector that provides an image pickup surface phase difference AF configured to detect a focus state of the image pickup lens by detecting a shift amount between a pair of image signals of an object image formed by the focus detecting pixel and the light flux that passes a pair of pupil areas of the image pickup lens. A principle of the image pickup surface phase difference AF is similar to that described in JP 2009-003122 and its FIGS. 5-7 and 16.

The contrast (TVAF) focus detector 130 is a focus detector configured to detect a focus state using a contrast detection method and a contrast component in image information obtained by the image processor 124. The TVAF detects a position of the focus lens 104 which provides a peak of a contrast value by moving the focus lens 104 using a peak searching method and a focus detection frame that defines a focus detecting area.

This embodiment utilizes a hybrid focus detector that combines an image pickup surface phase difference AF with the TVAF. Hence, this embodiment uses the image pickup surface phase difference AF to move the focus lens 104 to a nearly on-focus position and then the TVAF to precisely move the focus lens 104 to the on-focus position, thereby reconciling the responsiveness and the focus detection precision.

Figure 2:
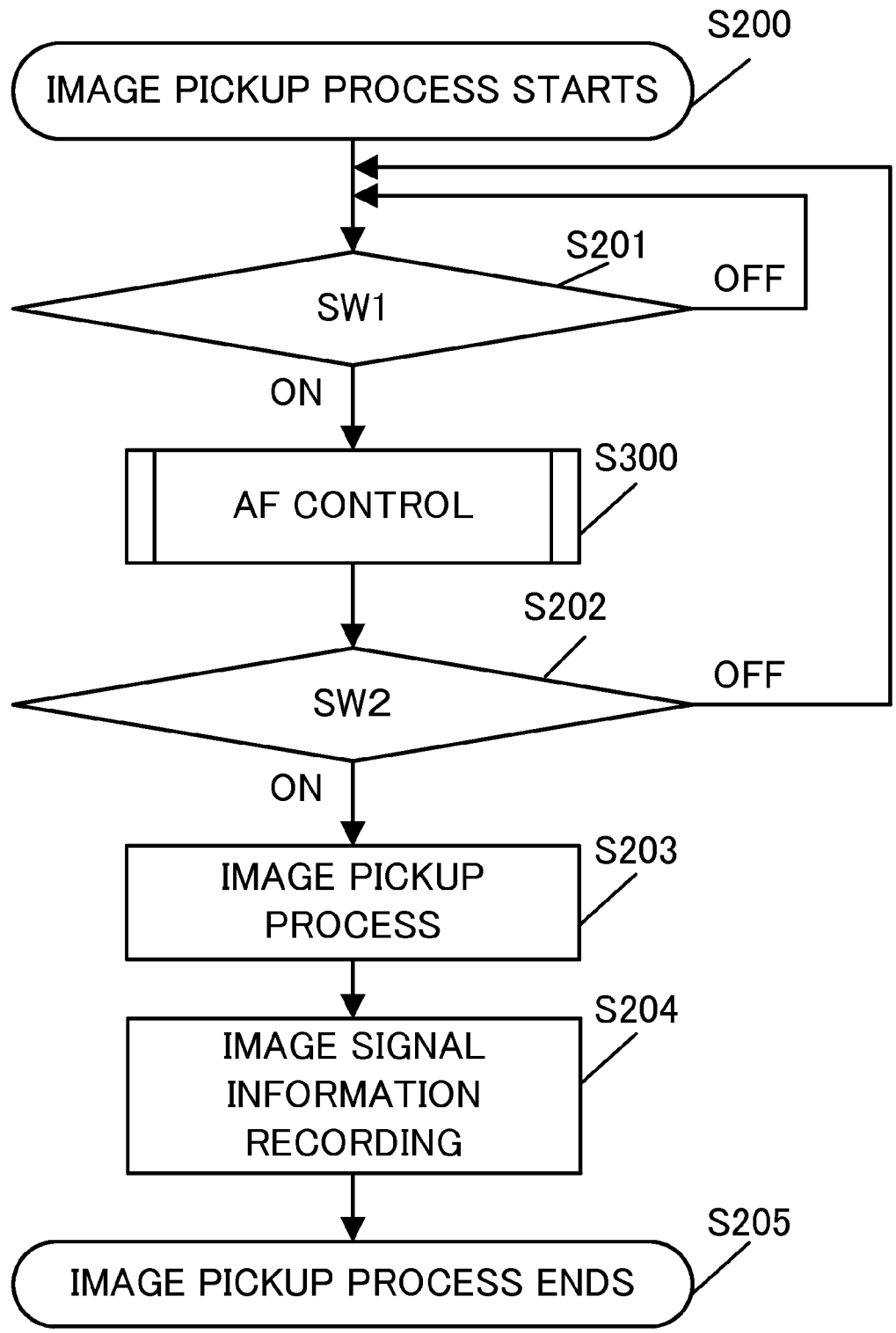
FIG. 2 is a flowchart of an image pickup operation of the image pickup apparatus illustrated by FIG. 1.
Figure 3:
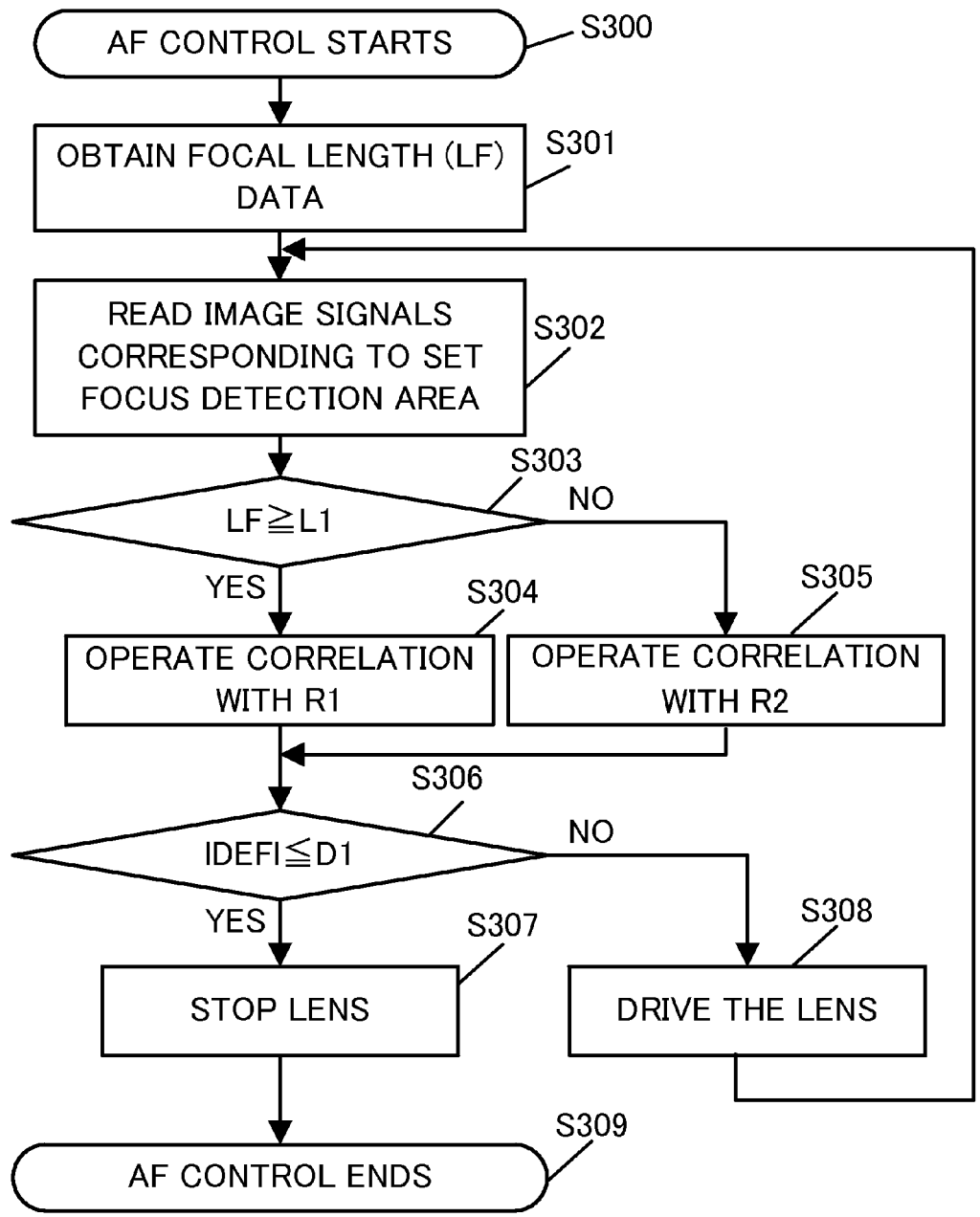
FIG. 3 is a flowchart for explaining the detail of S300 illustrated in FIG. 2.

Referring now to FIGS. 2 and 3, a description will be given of an operation at the image pickup time.

FIG. 2 is a flowchart for explaining an operation of the image pickup time, and FIG. 3 is a flowchart for explaining the detail of S300 in FIG. 2. In FIGS. 2 and 3, "S" is an abbreviation of the step, and this applies to FIGS. 5, 9, and 10, which will be described later.

Initially, when the image pickup button is pressed by manipulating the operational SW 127, the image pickup process starts (S200). The camera MPU 125 detects a state of the switch SW1 that is configured to turn on in the first stroke of the release button (S201). When the camera MPU 125 determines that the SW1 is pressed (On of S201), the camera MPU 125 performs the AF control as illustrated in FIG. 3 (S300). The camera MPU 125 waits until SW1 is pressed (Off of S201).

The camera MPU 125 initially communicates with the lens MPU 117 of the lens unit 100 and obtains focal length (LF) data of the image pickup lens (S301). Next, the camera MPU 125 reads image signals out of the focus detecting pixel row corresponding to the focus detection area that is set by the user via the operational SW 127 (S302).

FIG. 4A is a schematic view that illustrates a plurality of focus detecting pixel rows corresponding to focus detection areas 21a to 21i discretely arranged on the image pickup surface. Each focus detection area is assigned a pair of pixel rows that extend in the longitudinal and lateral directions from each focus detection area as a center. When the user manipulates the operational SW 127 to set the focus detection area 21a to be focus-detected, the image pickup surface phase difference focus detector 129 reads image signals out of the focus detecting pixels 22a and 23a corresponding to the focus detection area 21a.

Next, the camera MPU 125 compares the focal length LF with the threshold L1, and determines the number of operation pixels used to detect the defocus amount from the image signals (S303). For example, in order to reduce the influence of the background on the wide angle side of the lens, a comparatively short operation object range R3, an operation object range R1 wider than R2, and R3 wider than R1 are set to the focus detecting pixel row 23a illustrated in FIG. 4B. The centers of R1 and R3 correspond to the center of the focus detecting pixel row 23a, and R3 extends over the span of the focus detecting pixel row 23a. R3 is used unless a defocus amount is detected in the range of R2 or R1.

More specifically, when the camera MPU 125 determines that the focal length LF is equal to or larger than the threshold L1 (LF≥L1) (Yes of S303) or the focal length LF at the image pickup time is closer to the telephoto end than the threshold L1, the camera MPU 125 operates a correlation with R1 (S304). On the other hand, when the camera MPU 125 determines that the focal length LF is smaller than the threshold L1 (LF<L1) (No of S303) or the focal length LF of the lens at the image pickup time is closer to the wide angle end than the threshold L1, the camera MPU 125 operates the correlation with R2 (S305).

Next, the camera MPU 125 compares with the threshold D1 an absolute value of a defocus amount DEF detected by the correlation operation in S304 or S305 (S306). D1 is an (on-focus) allowance of a defocus amount that can be regarded as on-focus. When the camera MPU 125 determines that DEF is within the on-focus allowance (|DEF|≤D1) (Yes of S306), the camera MPU 125 stops driving the focus lens 104 (S307) and ends the AF control (S309). On the other hand, when the camera MPU 125 determines that DEF is out of the on-focus allowance (|DEF|>D1) (No of S306), the camera MPU 125 drives the focus lens 104 in accordance with the defocus amount (S308) and the flow returns to S302.

After the camera MPU 125 completes the AF control, the camera MPU 125 detects a status of the switch SW2 that is configured to turn on in the second stroke of the release button (S202). When determining that the SW2 is pressed (On of S202), the camera MPU 125 performs an image pickup process (S203), generates image information, and records the image information in a file. This image pickup process provides, for example, an image in which the focus detection area 21a selected by the user is focused. On the other hand, when the camera MPU 125 determines that SW2 is not pressed within a predetermined time period, the flow returns to S201 (Off of S202).

Next, the camera MPU 125 records output image signal information of the focus detecting pixel row illustrated in FIG. 4A in the file of the memory 128 (S204), and ends the process (S205). In recording the information in the file, a pixel output value of the image pickup surface may be embedded into a RAW image file or separately recorded in another file.

For example, the image signal information of the focus detecting pixel row 23a is obtained as output values with pixel numbers for each of a pair of object images, such as an A image and a B image in FIG. 4C where the A image and the B image are the same as those defined in JP 2009-003122. Therefore, the camera MPU 125 records a table illustrated in FIG. 4D in the memory 128. In FIG. 4D, a starting coordinate and an ending coordinate correspond to a left end coordinate and a right end coordinate in the focus detecting pixel row 23a in a coordinate system with an origin at the upper left end as illustrated in FIG. 4A.

Due to the above process, a detection of a focus state and focusing to an on-focus position are performed based on signal information of a fixed range of the focus detecting pixel row at the image pickup time, and the information of the image signals of the focus detecting pixel rows relating to the images and the entire image pickup surface are recorded in the file in the memory 128.

Referring now to a flowchart illustrated in FIG. 5, a description will be given of a display process method of a defocus amount executed by the camera MPU 125.

Figure 6A:
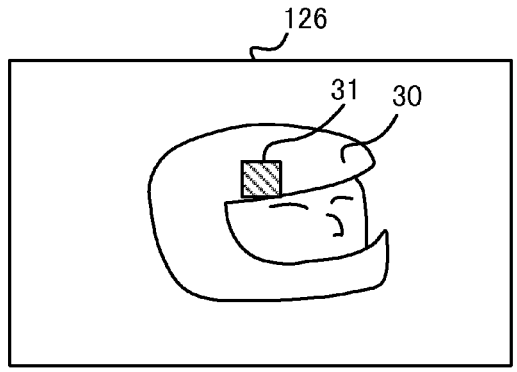
FIGS. 6A-6E are views that illustrate screens displayed on a display unit illustrated in FIG. 1.

When the display process of the defocus amount starts (S400), the camera MPU 125 initially determines whether an image recorded in the memory 128 and a focus detection area selected at the image pickup time are simultaneously reproduced and displayed on the display unit 126 (S401). FIG. 6A is a screen of the display unit 126, which illustrates a focus detection area 31 selected at the image pickup time in an image of a helmeted subject (man). The camera MPU 125 waits until the image 30 and the focus detection area 31 are displayed on the display unit 126.

Figure 6B:
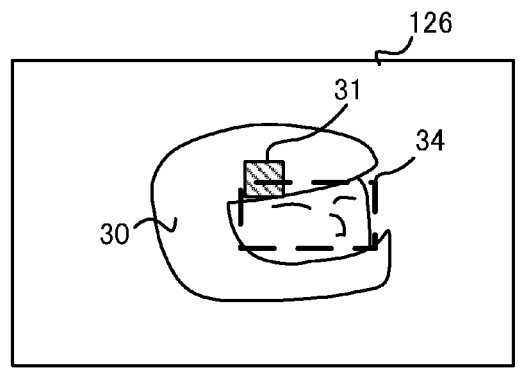

Next, the camera MPU 125 determines whether a designated area 34 is set to the image 30 displayed on the display unit 126 by the operational SW 127 (for example, by dragging) (S402). FIG. 6B illustrates the designated area 34 with a rectangular dotted line.

Figure 6C:
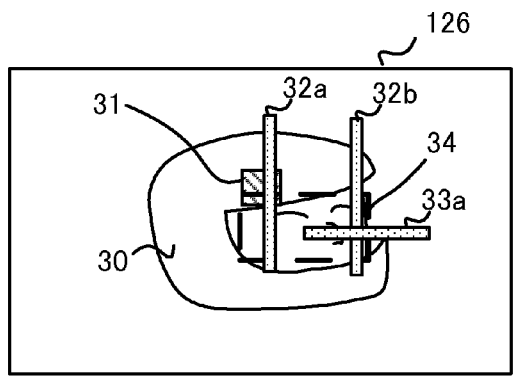

Next, the specifying unit 125d of the camera MPU 125 specifies a pair of image signals corresponding to the designated area 34 in the image signal stored in the memory 128. More specifically, the camera MPU 125 obtains the number N of focus detecting pixel rows at least partially contained in the designated area 34 (S403). FIG. 6C illustrates three focus detecting pixel rows 32a, 32b, and 33a at least partially contained in the designated area 34, and the number N of focus detecting pixel rows is 3 in this case.

Figure 7:
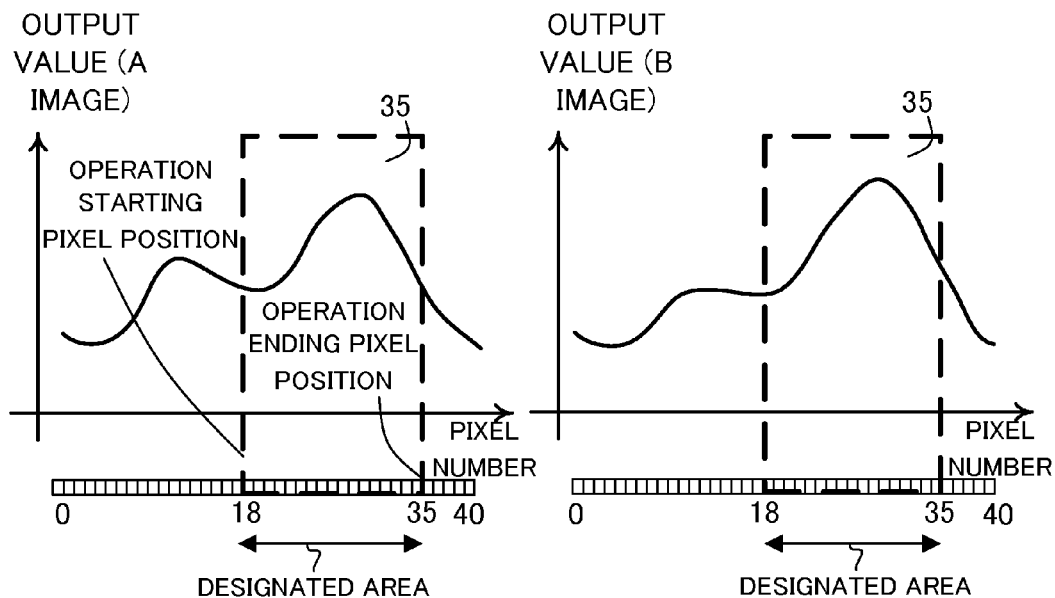
FIG. 7 is a view for explaining S405 and S500 illustrated in FIG. 5.
Figure 8:
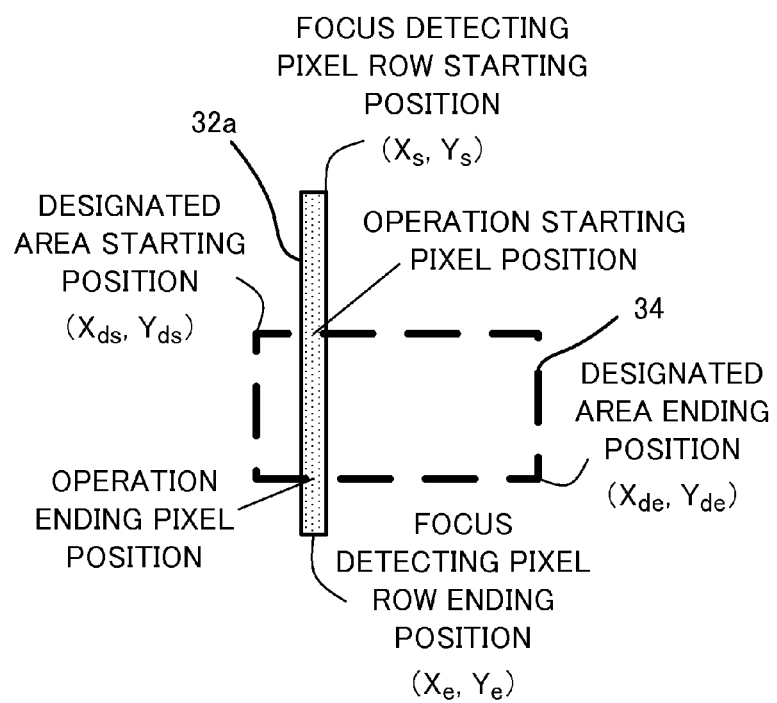
FIG. 8 is a view that illustrates a relationship between a designated area and a focus detecting pixel row.

Next, the camera MPU 125 determines whether there are a plurality of focus detecting pixel rows (or whether "N" is one) (S404). When the camera MPU 125 determines that "N" is one (Yes of S404), the camera MPU 125 detects a pixel range corresponding to an overlap area between each focus detecting pixel row and the designated area 34 (S405). For example, when an output signal of the focus detecting pixel row is illustrated as shown in FIG. 7, the camera MPU 125 finds a pixel area 35 corresponding to the designated area 34, i.e., a pixel value (index) of an operation starting position and a pixel value of an operation ending position. For example, when coordinates of the focus detecting pixel row 32a and the designated area 34 are defined as illustrated in FIG. 8, the camera MPU 125 calculates the pixel values of the operation starting position and the operation ending position as follows:

Pixel Value of Operation Starting Position=$(Y_{ds}-Y_s)/$ (Pixel Pitch)   EQUATION 1

Pixel Value of Operation Ending Position=$(Y_{de}-Y_s)/$ (Pixel Pitch)

In the table format illustrated in FIG. 4D, the image signal information corresponding to the pixel value of the operation stating position and the pixel value of the operation ending position are recorded as A image [the pixel value of the operation starting position] to A image [the pixel value of the operation ending position] and B image [the pixel value of the operation starting position] to B image [the pixel value of the operation ending position]. Thereby, the image signal information of the designated area 34 can be obtained.

On the other hand, when N is equal to or larger than 2 (No of S404), the camera MPU 125 selects one focus detecting pixel row (S500).

Next, the operating unit 125e in the camera MPU 125 operates a defocus amount of the designated area 34 using a pair of image signals specified by the specifying unit 125d. In other words, after S405 or S500, the camera MPU 125 calculates a defocus amount of the designated area 34 using a pixel range of the focus detecting pixel row corresponding to the designated area 34, and an output value of the image signal obtained from the table illustrated in FIG. 4D and the correlation operation in the phase difference detection method (S406).

Figure 6D:
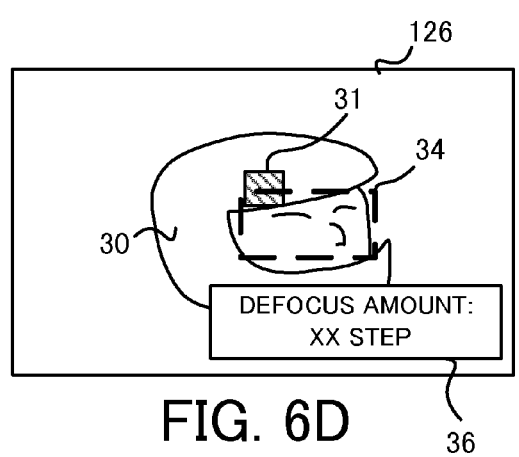

Next, the camera MPU 125 displays on the display unit 126, as illustrated in FIG. 6D, the image 30, the focus detection area 31 that is selected at the image pickup time and focused, the designated area 34, and a defocus amount 36 of the designated area 34 (from the focus detection area 31) (S407). In FIG. 6D, the defocus amount 36 of the designated area 34 is displayed as "XX STEP" in a lower right field in the screen of the display unit 126, but the position and size of this field are not limited.

Next, the camera MPU 125 determines based on the user's manipulation (not shown) whether the calculation of the defocus amount of the designated area is to be continued (S408), and when determining that it is to be continued (Yes of S408) then the flow returns to S402. On the other hand, when the camera MPU 125 determines that it is not to be continued (No of S408), the camera MPU 125 ends the process (S409).

Figure 9:
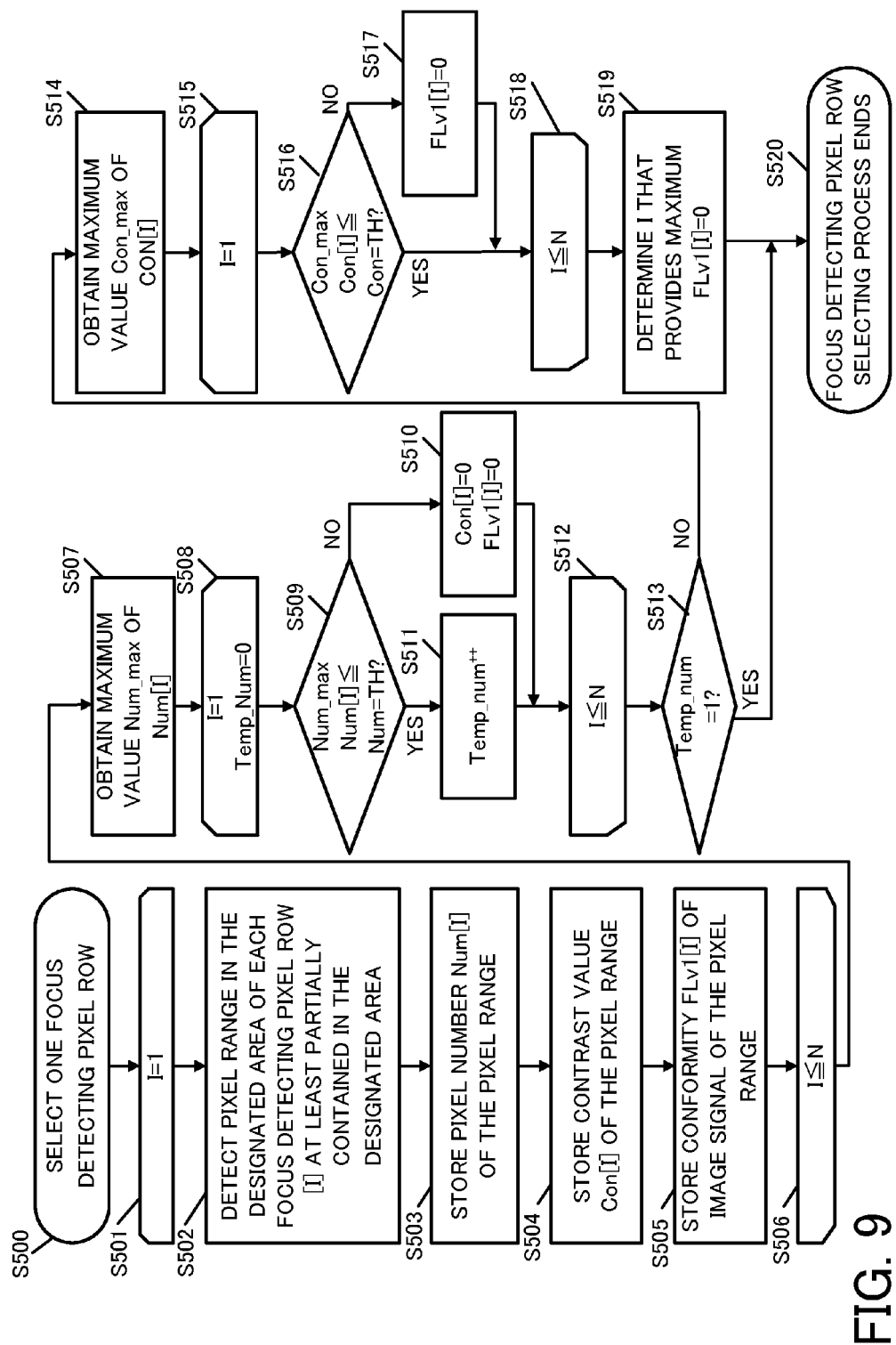
FIG. 9 is a flowchart for explaining the detail of S500 illustrated in FIG. 5.

Referring now to FIG. 9, the detail of S500 will be described. FIG. 9 is a flowchart for explaining the detail of the focus detecting pixel row selection process executed by the camera MPU 125.

S501 to S506 form a routine performed for each focus detecting pixel row found in S403.

Initially, the camera MPU 125 detects a pixel range in the designated area 34 of each focus detecting pixel row at least partially contained in the designated area 34, similar to S405 (S502).

Next, the camera MPU 125 stores the number of pixels Num[I] of the pixel range found in S502 in the RAM 125b (S503). For example, the pixel position of the focus detecting pixel row at least partially contained in the pixel area 35 illustrated in FIG. 7 starts from the eighteenth pixel from the left end to the thirty-fifth pixel and the number of pixels Num[I] becomes 35−18+1=18.

Next, the camera MPU 125 stores a contrast value Con[I] of the image signal of the pixel range found by S502 in the RAM 125b (S504). The contrast value may use a primary contrast calculated from a sum of an absolute value of an output difference between adjacent pixels of the image signal of the focus detecting pixel row, and a secondary contrast calculated from a sum of squares of the output difference between the adjacent pixels.

Next, the camera MPU 125 stores conformity Flvl[I] in the RAM 125b between the image signals (A image and B image) of the pixel range found by S502 (S505). The image conformity is found by evaluating the conformity of the waveform of the focus detecting pixel outputs or by the correlation operation of a pair of object images.

Once the conformity is calculated in each focus detecting pixel row (S506), the camera MPU 125 selects the focus detecting pixel row used to calculate the defocus amount from among "I" focus detecting pixel rows. Initially, the camera MPU 125 obtains a maximum value Num_max of Num[I] (S507).

S508 to S512 form a routine relating to the pixel range contained in the designated area 34 for all candidate focus detecting pixel rows.

Initially, the camera MPU 125 sets a searching index I to 1, and clears a variable Temp_num for a management of the number of pixel rows (or sets it to 0) (S508).

Next, the camera MPU 125 compares a difference between Num_max and Num[I] with the threshold Num_TH (S509). When determining that the difference is larger than the threshold Num_TH (No of S509), the camera MPU 125 clears values of Con[I] and Flvl[I] of the focus detecting pixel row (S510). On the other hand, when determining that the difference is equal to or smaller than the threshold Num_TH (Yes of S509), the camera MPU 125 increments Temp_num (S511).

A routine S507 to S511 enables only the focus detecting pixel row(s) having a large number of pixels overlapping the designated area to be extracted from the "I" focus detecting pixel rows. Instead of S509 to S511, the number of pixels contained in the designated area may be sorted in descending order and only a predetermined number of focus detecting pixel rows having a large number of pixels may be extracted. In other words, for a plurality of focus detecting pixel rows at least partially contained in the designated area 34 and usable for the image pickup surface phase difference focus detector 129, a similar effect can be obtained by selecting the focus detecting pixel rows in which the number of pixels contained in the designated area 34 is equal to or larger than a first threshold. In addition, the specifying unit 125d may specify the image signal corresponding to the selected focus detecting pixel row.

Next, when determining that Temp_num is 1 (Yes of S513), the camera MPU 125 ends the process because a sole candidate has been obtained (S520).

On the other hand, when determining that Temp_num is larger than 1 (No of S513), the camera MPU 125 obtains a maximum value Con_max of Con[I] because there are still a plurality of candidates. Therefore, the camera MPU 125 obtains a maximum value Con_max of Con[I] (S514).

S515 to S518 form a routine performed for each candidate focus detecting pixel row(s). Initially, the camera MPU 125 compares a difference between Con_max and Con[I] with the threshold Con_TH (S516). The focus detecting pixel row whose Con[I] has been cleared by S510 always moves to S517. When determining that the difference is larger than the threshold Con_TH (No of S516), the camera MPU 125 clears a value of FLvl[I] of the focus detecting pixel row (S517). On the other hand, when determining that the difference is equal to or smaller than the threshold Con_TH (Yes of S516), the camera MPU 125 selects it. As a result, the focus detecting pixel row having a large number of pixels contained in the designated area and a high contrast value can be extracted. In the meanwhile, the focus detecting pixel row may be extracted by sorting all focus detecting pixel rows in descending order with respect to the contrast value and by picking up a predetermined number of focus detecting pixels. In other words, for a plurality of focus detecting pixel rows at least partially contained in the designated area 34 and usable for the image pickup surface phase difference detector 129, a similar effect can be obtained by selecting the focus detecting pixel rows contained in the designated area 34 having a contrast value equal to or larger than a second threshold. In addition, the specifying unit 125d may specify the image signal corresponding to the selected focus detecting pixel row.

Next, the camera MPU 125 selects one of the candidate focus detecting pixel rows which one has the best or maximum image conformity (S519) and completes the process (S520). Since S510 and S517 have cleared Flvl[I] of the focus detecting pixel rows having a small number of pixels contained in the designated area or a low contrast value, S519 does not select these focus detecting pixel rows.

Due to the above procedure, once a user designates an area at the image reproduction time, a defocus amount of the designated area using the focus detection area used for the image pickup time can be presented to the user.

It is conventionally necessary to confirm a taken image in setting a correction amount for a defocus amount to be corrected, and thus the setting of the correction value and the confirmation of the taken image need to be arduously repeated. On the other hand, according to this embodiment, once a taken image is reproduced and a designated area 34 to be focused is set, its defocus amount can be acquired.

A dedicated phase difference AF sensor may be used instead of the image pickup surface phase difference AF. The phase difference AF unit includes an area (or line) sensor (not shown) and detects a focus state of the image pickup lens in the phase difference detection method for each focus detection area. The phase difference AF unit converges the light from the object, and separates the light into two light fluxes using a separator lens so that each of the two light fluxes can form an image on a corresponding one of two photoelectric conversion element rows. As an object distance changes, a distance varies between the object images caused by the two light fluxes. The photoelectric conversion element row accumulates electric charges for a time period determined by the object brightness, an output of the photoelectric conversion element row is digitalized by an A/D converter after the electric charges are accumulated, and a correlation operation circuit detects a correlation between the digitalized signals. Due to this correlation operation, a shift amount between the two signals can be calculated in a unit of a pixel. The phase difference AF unit measures an object distance in the optical axis direction using a principle of a triangulation using the shift amount, a distance between the two photoelectric element rows, and a focal length of the distance measurement optical system, and outputs the result to the camera MPU 125. In other words, the phase difference AF unit also serves as a distance information acquirer configured to acquire distance information of an (object) distance between each focus detection area and the object.

Figure 5:
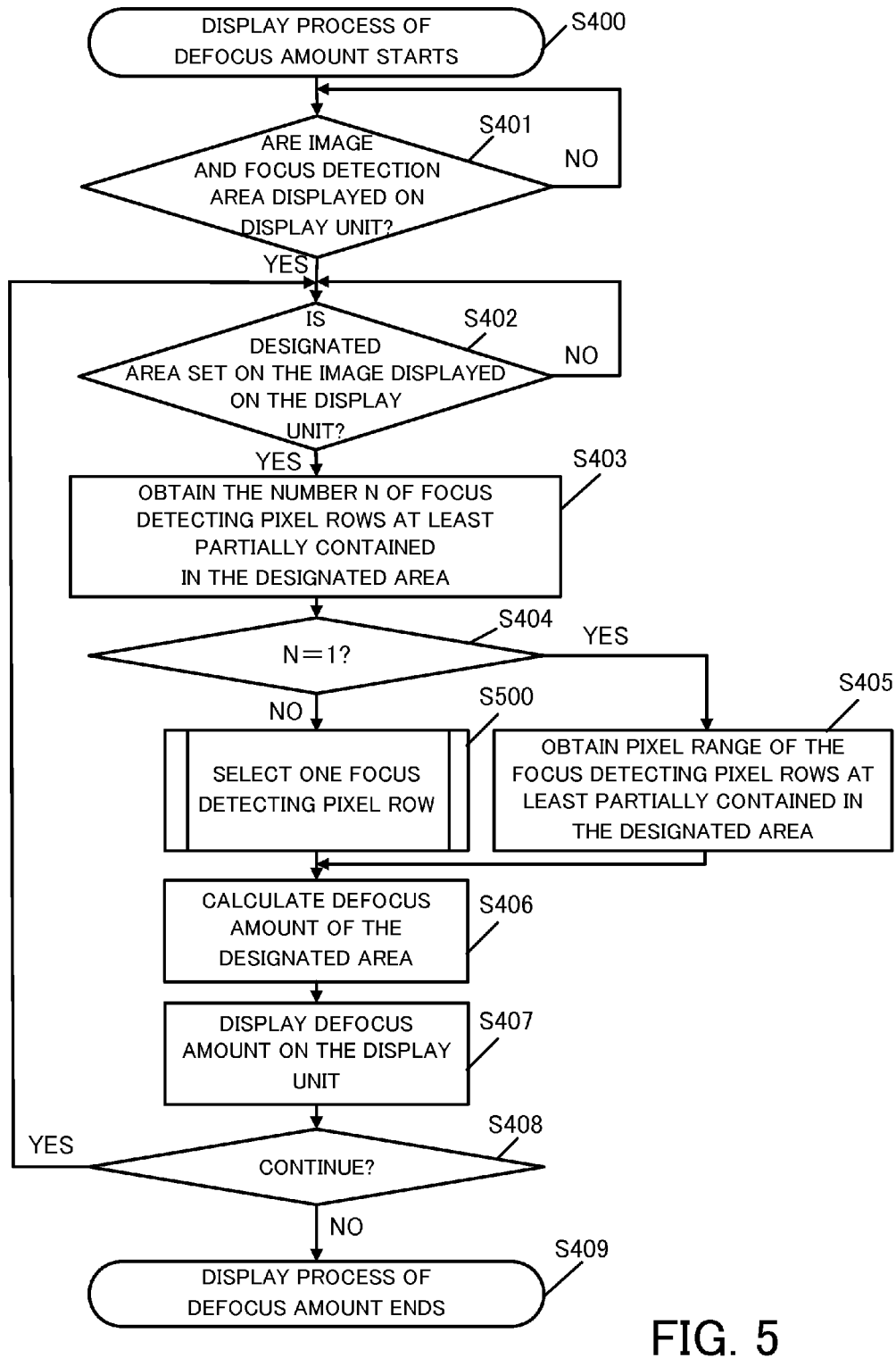
FIG. 5 is a flowchart for explaining a display processing method of a defocus amount of the image pickup apparatus illustrated in FIG. 1.
Figure 10:
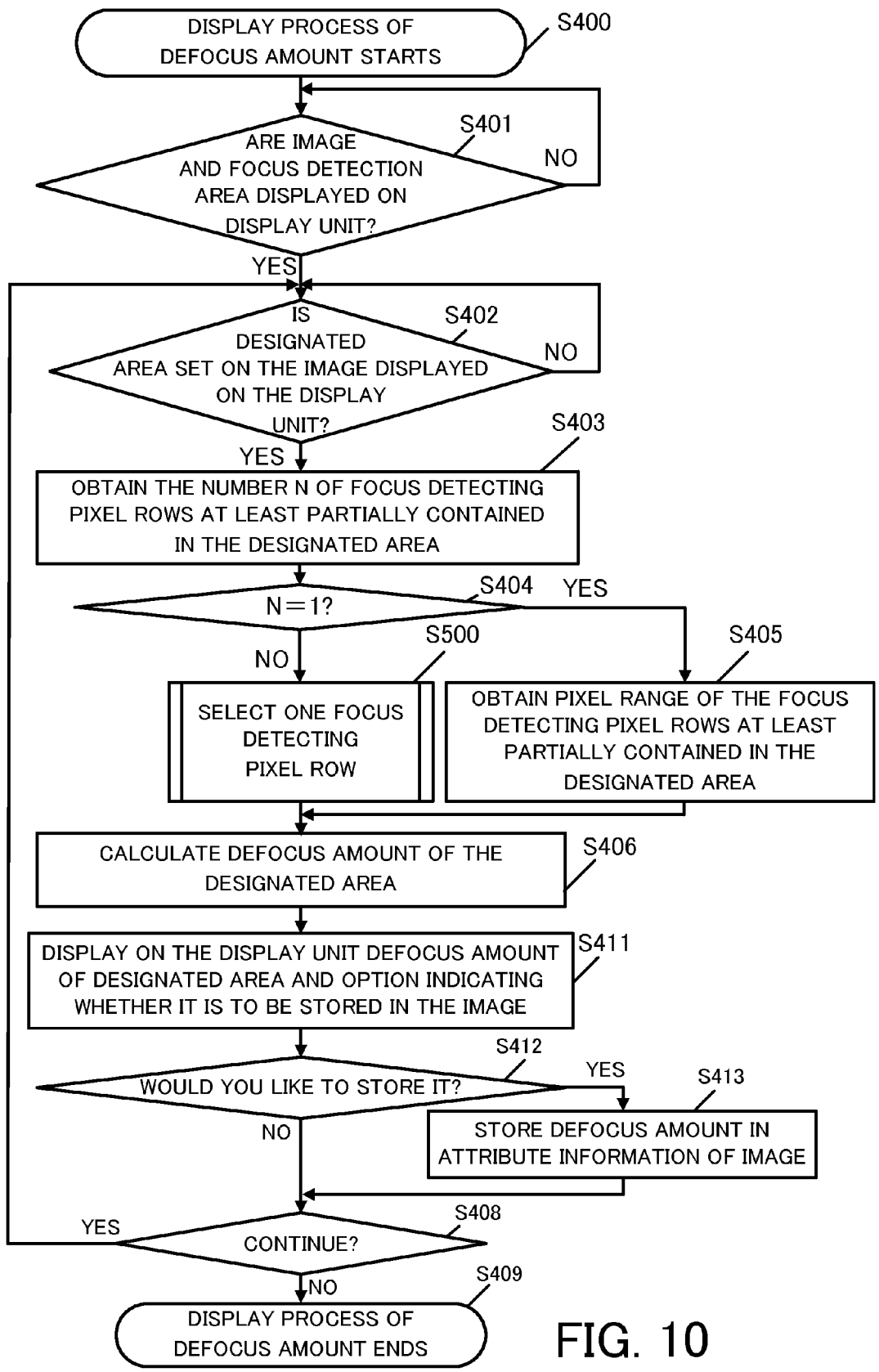
FIG. 10 is a flowchart of a variation of FIG. 5.

FIG. 10 is a variation of FIG. 5, and S401 to S407 are the same as those of FIG. 5 and a description thereof will be omitted. In FIG. 10, S411 to S413 are added instead of S407.

Figure 6E:
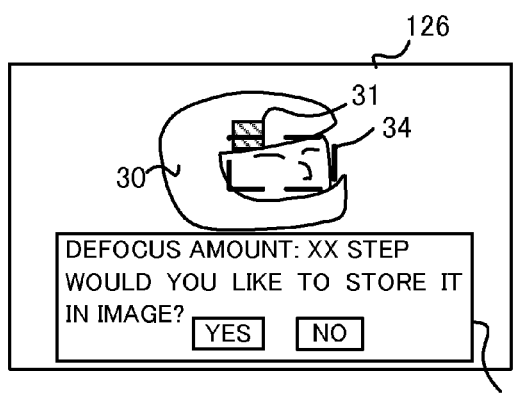

After S406, the camera MPU 125 displays, as shown in FIG. 6E, information 37 that provides an option on the display unit 126, of whether a defocus amount of the designated area 34 corresponding to the focus detection area 21a selected at the image pickup time is to be recorded with the image 30 (S411).

When determining that the defocus amount of the designated area 34 is to be recorded (Yes of S412) as a result of that the user inputs through the operational SW 127 (Yes of S412), the camera MPU 125 records it as attribute information in an EXIF maker note of the image 30 (S413). On the other hand, when determining that the defocus amount of the designated area 34 is not to be recorded (No of S412) or after S413, the flow moves to S408.

Figure 11:
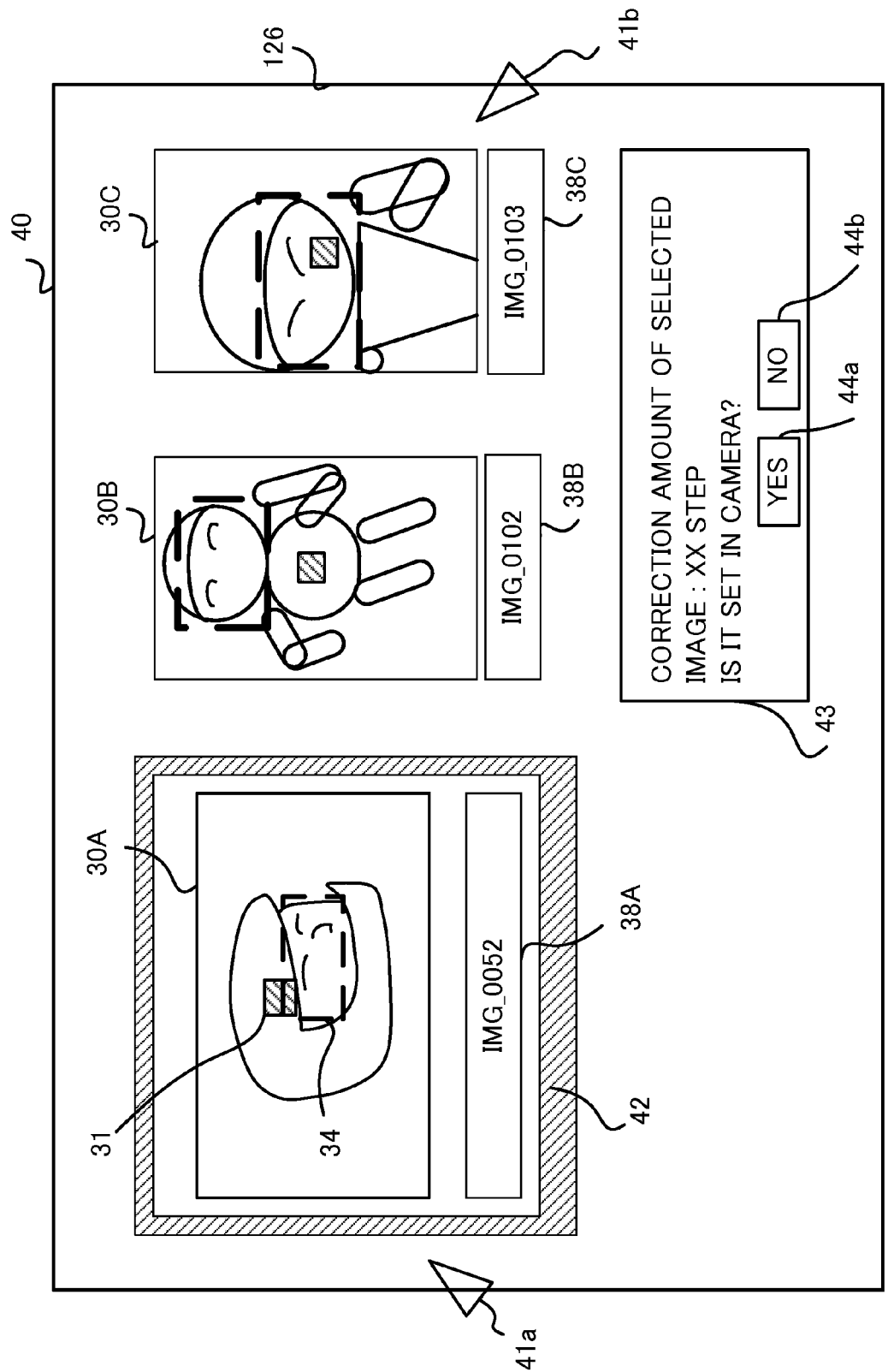
FIG. 11 is a view that illustrates a screen displayed on the display unit in S412 of FIG. 10.

Referring now to FIG. 11, a description will be given of a method executed by the camera MPU 125, of setting a correction amount used to correct a focus amount of the designated area 34 to the image pickup apparatus. FIG. 11 is a view that illustrates an image pickup screen displayed on the display unit 126.

As the user selects a correction amount setting menu (not shown) by manipulating the operational SW 127, the display unit 126 displays a setting screen 40 illustrated in FIG. 11. The setting screen 40 displays an image in which the defocus amount of S412 in FIG. 10 is stored as attribute information.

In FIG. 11, each of object images 30A-30C has a defocus amount as its attribute and a corresponding one of image numbers 38A-38C. Icons 41a and 41b serves as a display switch to the image having the attribute information except for the currently displayed image. A frame 42 indicates an image having currently selected attribute information. In the currently selected image, the focus detection area 31 selected at the image pickup time and the designated area 34 are also displayed.

FIG. 11 illustrates information 43 including a correction amount recorded in a currently selected image 30A and an option of whether the correction value is to be set in the camera. When the user selects a "yes" button 44a via the operation SW 127, the displayed correction amount of the camera is set to the EEPROM 125c. As a result, when a similar image is taken in the subsequent photography, the designated area 34 can be more precisely focused in the obtained image. On the other hand, when the user selects a "no" button 44b via the operational SW 127, the correction amount is not set and the current setting is preserved.

Since the correction amount set in this embodiment is effective to an image pickup scene relating to the image used to calculate the correction amount, the camera MPU 125 may switch a status of the correction value between valid/invalid in accordance with a manipulation of the operational SW 127.

This embodiment records the correction value of the defocus amount of the designated area 34 together with the image 30 and makes the correction value settable, improving the operability. Instead of displaying the information 37 illustrated in FIG. 6E, the information 43 illustrated in FIG. 11 may be displayed and S413 may set the correction value.

While the present invention has been described with reference to embodiments, it is to be understood that the invention is not limited to the disclosed embodiments. The scope of the following claims is to be accorded the broadest interpretation so as to encompass all such modifications and equivalent structures and functions.

The image processing apparatus may be implemented as a computer or may be integrated with an image pickup apparatus. The image pickup apparatus is applicable to the photography of an object.

This application claims the benefit of Japanese Patent Application No. 2009-172088, filed Jul. 23, 2009, which is hereby incorporated by reference herein in its entirety.

What is claimed is:

1. An image processing apparatus comprising:
   an image pickup device configured to photoelectrically convert an object image;
   a focus detector configured to detect a focus state of a focus detection area by detecting a phase difference between a pair of image signals of the object image;
   a controller configured to record in a memory an image generated from output of the image pickup device that is processed for recording, and information on pairs of image signals for focus detection corresponding to the recorded image; and
   a setting unit configured to set a designated area designated by a user in the image recorded in the memory and reproduced;
   wherein the controller calculates a defocus amount of the designated area using information on a pair of image signals corresponding to the designated area among the information on pairs of image signals recorded in the memory, and displays information related to the defocus amount of the designated area.

2. The image processing apparatus according to claim 1, wherein the controller records the defocus amount of the designated area, and corrects a focus state in later photographing based on the recorded defocus amount.

3. The image processing apparatus according to claim 2, wherein the controller stores the defocus amount of the designated area in attribute information of the image.

4. The image processing apparatus according to claim 1, wherein the image pickup device includes a plurality of focus detecting pixels each of which receives light that passes a part of an exit pupil of an image pickup optical system,
   wherein the controller calculates the defocus amount using information on a pair of image signals output from the focus detecting pixels at least partially contained in an area of the image pickup device corresponding to the designated area.

5. The image processing apparatus according to claim 1, wherein the controller stores in the memory the focus detection area used for the recorded image.

6. An image processing method of an image processing apparatus having an image pickup device configured to photoelectrically convert an object image, comprising:
   detecting a focus state of a focus detection area by detecting a phase difference between a pair of image signals of the object image;
   recording in a memory an image generated from output of the image pickup device that is processed for recording, and information on pairs of image signals for focus detection corresponding to the recorded image;
   detecting a designated area designated by a user in the image recorded in the memory and reproduced;
   calculating a defocus amount of the designated area using information on a pair of image signals corresponding to the designated area among the information on pairs of image signals recorded in the memory; and
   displaying information related to the defocus amount of the designated area.

7. The image processing method according to claim 6, further comprising:
   determining whether the defocus amount of the designated area is to be recorded with the image; and
   recording the defocus amount of the designated area in attribute information of the image when the processor determines that the defocus amount of the designated area is to be recorded with the image.

8. The image processing method according to claim 6, further comprising setting a correction amount of the defocus amount of the designated area to the image processing apparatus.

9. The image processing method according to claim 8, further comprising validating or invalidating a status of the correction.

10. The image processing method according to claim 6, wherein the image pickup device includes a plurality of focus detecting pixels each of which receive light that passes a part of an exit pupil of an image pickup optical system, the method further comprising:
- determining whether a plurality of focus detecting pixel rows is at least partially contained in the designated area; and
- selecting a focus detecting pixel row, number of pixels that is contained in the designated pixel area being larger than a first threshold,
- wherein in the calculating step, calculating the defocus amount using information on a pair of image signals output from the focus detecting pixel row selected in the selecting step.

11. The image processing method according to claim 10, wherein if there are plural focus detecting pixel rows selected in the selecting step, further selecting a focus detecting pixel row, a contrast value of pixels contained in the designated area of that being larger than a second threshold.

12. The image processing method according to claim 10, wherein if there are plural focus detecting pixel rows selected in the selecting step, further selecting a focus detecting pixel row having a maximum conformity between a pair of image signals of that row.

13. The image processing method according to claim 6, wherein the image pickup device includes a plurality of focus detecting pixels each of which receives light that passes a part of an exit pupil of an image pickup optical system,
- wherein in the calculating step, calculating the defocus amount using information on a pair of image signals output from the focus detecting pixels at least partially contained in an area of the image pickup device corresponding to the designated area.

14. A non-transitory computer-readable storage medium storing a program that enables a processor to execute an image processing method of an image processing apparatus having an image pickup device configured to photoelectrically convert an object image, comprising:
- detecting a focus state of a focus detection area by detecting a phase difference between a pair of image signals of the object image;
- recording in a memory an image generated from output of the image pickup device that is processed for recording, and information on pairs of image signals for focus detection corresponding to the recorded image;
- detecting a designated area designated by a user in the image recorded in the memory and reproduced;
- calculating a defocus amount of the designated area using information on a pair of image signals corresponding to the designated area among the information on pairs of image signals recorded in the memory; and
- displaying information related to the defocus amount of the designated area.

* * * * *